(12) United States Patent  (10) Patent No.: US 6,732,779 B2
Wellman et al.  (45) Date of Patent: May 11, 2004

(54) METHOD AND APPARATUS FOR BUILDING A MULTI-LAYERED FINITE LENGTH STRUCTURE

(75) Inventors: Ronald Alan Wellman, Coldwater, OH (US); Kent Alan Stubbendieck, Wadsworth, OH (US); Mario Antonio Rago, Toronto (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 295 days.

(21) Appl. No.: 09/946,181

(22) Filed: Sep. 5, 2001

(65) Prior Publication Data

US 2003/0044617 A1 Mar. 6, 2003

(51) Int. Cl.[7] .................... B65H 35/06; B65G 37/00; B32B 35/00
(52) U.S. Cl. ........................ 156/517; 83/167; 83/650; 83/732; 198/347.1; 198/364; 198/418.5
(58) Field of Search ................... 156/250, 256, 156/263–265, 269, 436, 510, 512, 516, 517, 519, 520; 83/29, 167, 732, 409, 649, 650, 922; 198/347.1, 348, 364, 418, 418.5

(56) References Cited

U.S. PATENT DOCUMENTS

| | | | |
|---|---|---|---|
| 3,582,154 A | 6/1971 | Russ, Sr. ................. | 305/35 EB |
| 3,703,321 A | 11/1972 | Schoonover .................. | 305/38 |
| 3,781,067 A | 12/1973 | Dodson et al. ................ | 305/35 |
| 4,207,052 A | 6/1980 | Satzler ......................... | 425/394 |
| 4,295,916 A * | 10/1981 | Stevens ........................ | 156/397 |
| 4,343,667 A | 8/1982 | Hollis .......................... | 156/157 |
| 4,548,663 A | 10/1985 | Worcester .................... | 156/159 |
| 4,627,886 A * | 12/1986 | Grone et al. ................. | 156/361 |
| 5,066,352 A | 11/1991 | Albers et al. ................ | 156/265 |
| 5,141,572 A * | 8/1992 | Gerber ......................... | 156/64 |
| 5,536,464 A | 7/1996 | Muramatsu .................. | 264/254 |

* cited by examiner

Primary Examiner—Richard Crispino
Assistant Examiner—Sing P. Chan
(74) Attorney, Agent, or Firm—Richard B. O'Planick; Nancy T. Krawczyk (57) ABSTRACT

A building unit for constructing a multi-layered, finite length structure, and a method of building such a structure is disclosed. Rolls of stock material are stored in cartridge stations adjacent to a build table. Mounted on the build table and capable of traveling the length of the build table is a build shuttle. The stock material is moved onto the build shuttle and as the shuttle travels the length of the table, the material is dispensed and laid onto the table. The shear assembly on the build shuttle cuts the material to a specified length. In this manner, a plurality of layers are laid onto the table until a structure containing a desired number of layers is achieved.

17 Claims, 10 Drawing Sheets

METHOD AND APPARATUS FOR BUILDING A MULTI-LAYERED FINITE LENGTH STRUCTURE

FIELD OF THE INVENTION

The present invention is directed to a building unit. More specifically, disclosed is a building unit for building a finite-length, multi-layered structure.

BACKGROUND OF THE INVENTION

In many manufacturing industries, a structure comprising a plurality of layers must be built. One such example is an endless track for vehicles. The endless track, or belt, is assembled over a plurality of wheels, at least one of which is a drive wheel, and it is engaged by the drive wheel.

In known track forming methods, and methods conventionally used in the art, the track carcass, the various rubber layers and reinforcement means, are wound on a fixed circumference drum. The circular carcass is then placed into an open "C" press for curing, wherein the first and last heat must match up to create the appearance of an endless built and cured rubber track. U.S. Pat. Nos. 5,536,464, and 4,207,052 disclose this method of manufacturing. However, because the building drum has a fixed circumferential dimension, the size of the carcass which can be built is limited.

SUMMARY OF THE INVENTION

The present invention is directed to a building unit for building multi-layered, finite length structures. The length of the structure is limited only by the size of the building table, permitting the manufacture of a variety of lengths of the layered structure. When building carcasses for vehicle tracks, any length track may be manufactured and the size is not limited by a building drum dimension.

One aspect of the invention is an apparatus for building a finite length structure, the structure comprising at least one sheet of material, the apparatus comprising a build shuttle. The build shuttle is comprised of a rectangular base frame having two length beams and two width beams and a vertical column mounted on one of the length beams and towards one end of the base frame. Mounted on the vertical column is at least one drive. Distanced from the vertical column and mounted on the base frame is a shear assembly.

In a further aspect of the invention, the build shuttle has a motor mounted at the base of the vertical column. The motor provides power to the drive wheel.

In another aspect of the invention, a pair of drive wheels are mounted on the vertical column, the drives wheels being vertically and horizontally offset from one another. This construction of the vertical drive is most applicable when the roll of material being used to build the multi-layered structure employs a separator sheet between adjacent rolls of the material. One drive wheel powers the material roll while the other drive wheel powers the separator sheet take-up roll.

In another aspect of the invention, the build shuttle has at least one conveyor adjacent to the shear assembly for transporting a material. The conveyor may be able to shift its position relative to the base frame to ensure that the material being laid onto the table is aligned with any previously laid sheets of material.

The build shuttle may also be provided with stitching means located at the end of the base frame to ensure that the layers of material make contact with the previously laid sheets of material.

In another aspect of the invention, the build table is comprised of a conveyor belt. The construction of the build table surface from a conveyor belt assists in the removal of the multi-layered structure from the build table and further automates the building process.

In another aspect of the invention, the building unit is for building a finite length carcass structure comprising at least one sheet of vulcanizable, uncured material. The building unit has a build table and a build shuttle. The build table is comprised of a conveyor belt. The build shuttle comprising a rectangular base frame having two length beams and two width beams and a vertical column mounted on one of the length beams of the base frame and towards one end of the base frame. A pair of drive wheels are mounted on the vertical column. Distanced from the vertical column, there is a shear assembly comprising a pair of opposing blades, the shear assembly being able to pivot angularly relative to the width of the base frame. Adjacent to the shear assembly, is at least one conveyor for transporting a material. The build shuttle is mounted on the build table and has means to travel along the length of the build table.

In another aspect of the invention, adjacent to the build table is a plurality of cartridge station. Each cartridge station contains a roll of stock material. The cartridge station may also have means to dispense to the material on to the conveyor belts of the build shuttle.

Also disclosed is a method for building a finite length multi-layered structure, the structure comprising a plurality of sheets of materials. The method is comprised of the steps of a) dispensing the material from a roll of material, b) as the material is being dispensed from the roll of material, laying the dispensed length of the material onto a flat surface, and c) cutting the material to form the sheet of material. These steps are repeated to achieve a structure of a plurality of sheets of materials.

In one aspect of the disclosed building method, the building method includes the additional steps of a) selecting a cartridge containing the roll of material and b) moving the cartridge from a storage area to a dispensing unit.

BRIEF DESCRIPTION OF THE DRAWINGS

The invention will be described by way of example and with reference to the accompanying drawings in which.

DETAILED DESCRIPTION OF THE INVENTION

The build unit of the present invention and its components are illustrated in FIGS. 1–10. The build unit has a build table 2, a build shuttle 4 which travels the length of the build table 2, and at least one load cartridge 6. The build unit is discussed in relation to laying a plurality of elastomeric and reinforced elastomeric materials.

However, the build unit may be used to dispense any type of material that is stored in a roll form and where it is desired to form a finite length, multi-layered structure, regardless of what further manufacturing steps may be performed on the structure.

Figure 1:
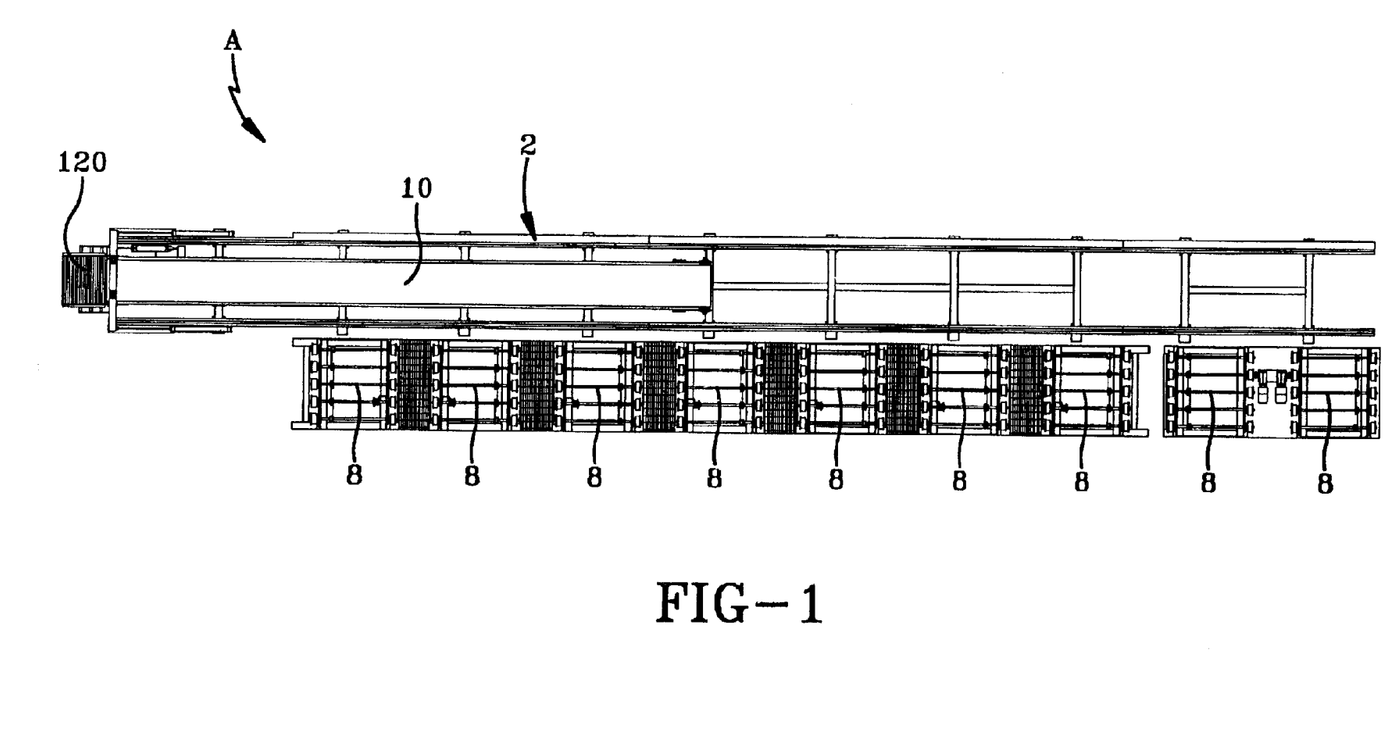
FIG. 1 is an overhead view of the building unit.

The build table 2, see FIG. 1 (illustrated without the build shuttle 4), is located adjacent a plurality of cartridge stations 8. The build table 2 has a length at least equivalent to the circumferential length of the largest belt that can be built in the disclosed manufacturing system. The primary component of the table 2 is a powered conveyor belt 10. The underside of the conveyor belt 10 is preferably ribbed to provide for tracking of the belt 10. The conveyor belt 10 is powered by a motor 12 at one end of the build table 2. The table 2 is mounted on a plurality of load units (not illustrated).

The load units provide the total weight of material laid upon the build table 2. This is essential if the built-up track carcass is to be built to weight specifications. Cartridge stations 8 are distanced from each other along the side of the build table 2.

Figure 2:
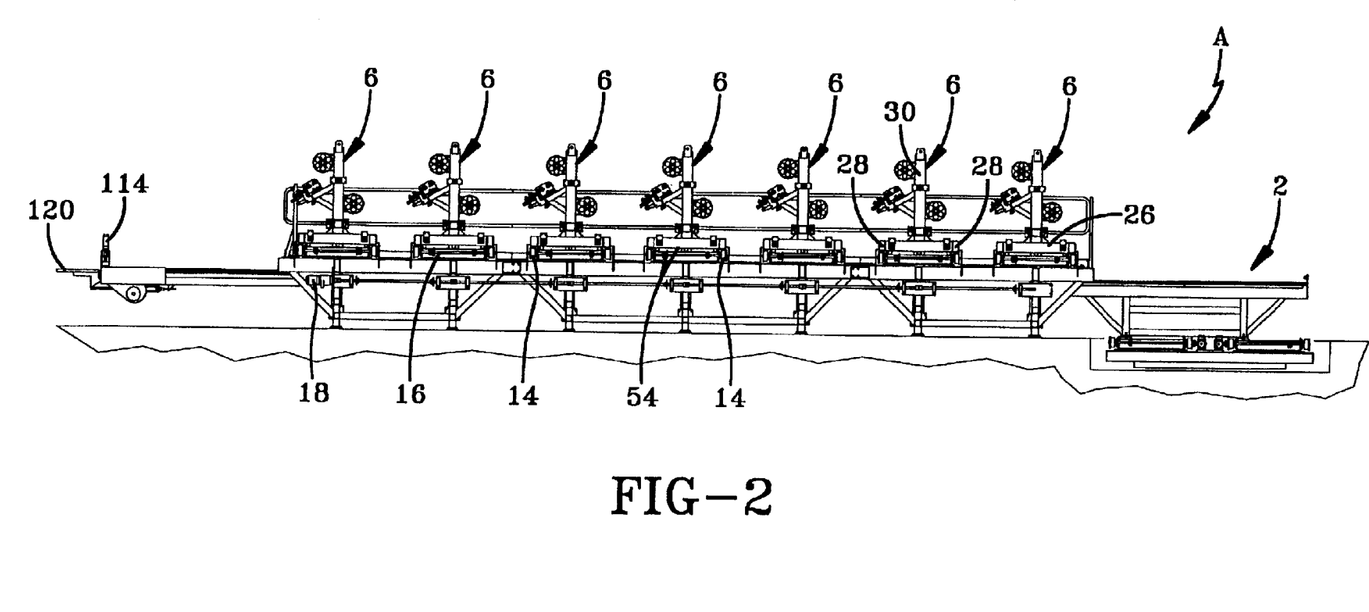
FIG. 2 is a side view of the building unit.

FIG. 2 illustrates a side view of the build unit A from the side facing the cartridge stations 8 and with empty load cartridges 6. Along the base of each cartridge station 8 are pairs of drive wheels 14. The drive wheels 14 in each pair are connected by an axle 16. When the cartridge 6 is in its cartridge station 8, the cartridge 6 rest on the drive wheels 14. The number and type of wheels 14 must be sufficient to support the weight of the fully loaded cartridge 6. The pairs of wheels 14 are connected to a clutch at each cartridge station 8, synchronizing the speed and movement of the wheels 14. The clutches at each station 8 are connected to a motor 18.

Figure 4:
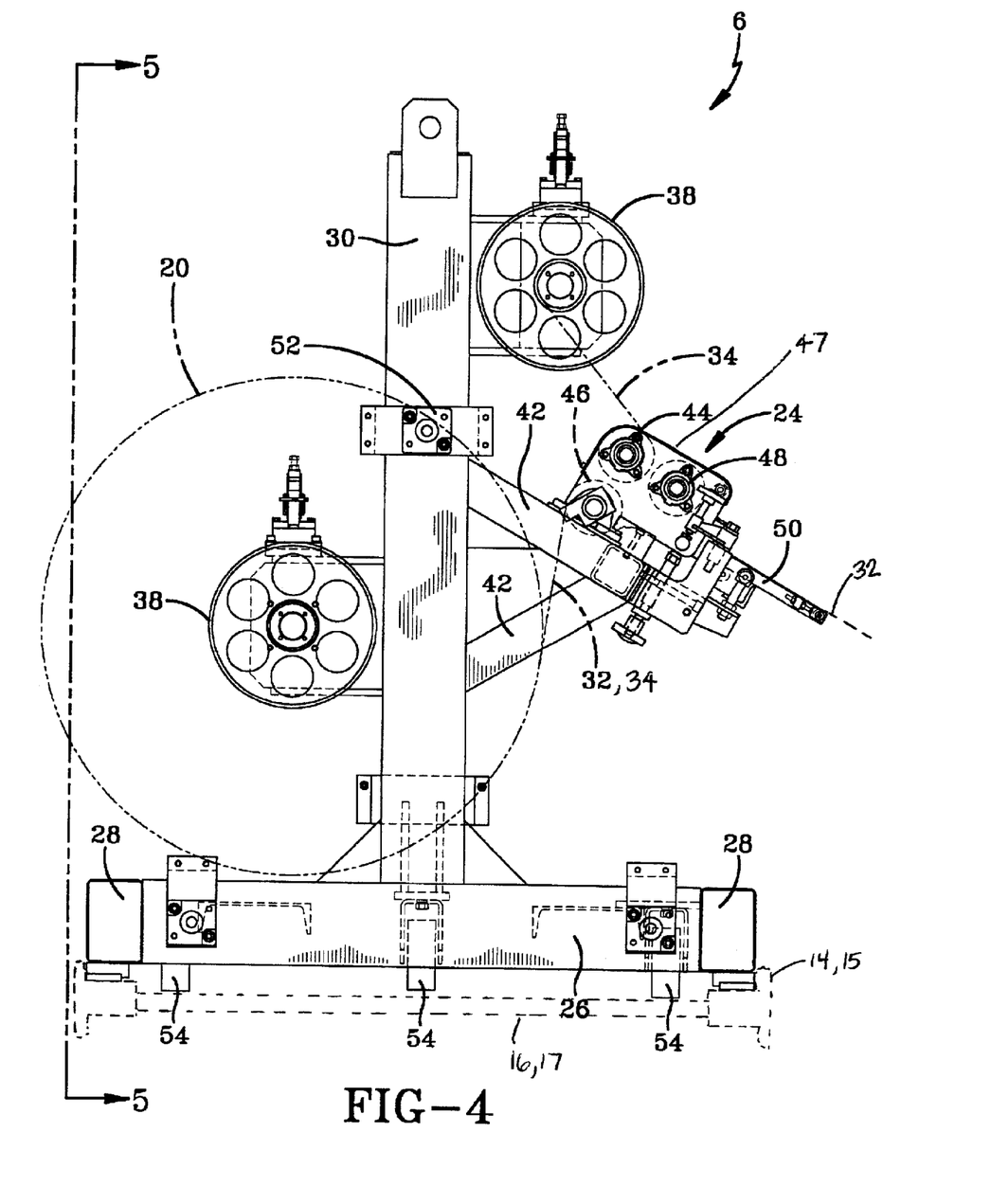
FIG. 4 is side view of a material cartridge.
Figure 5:
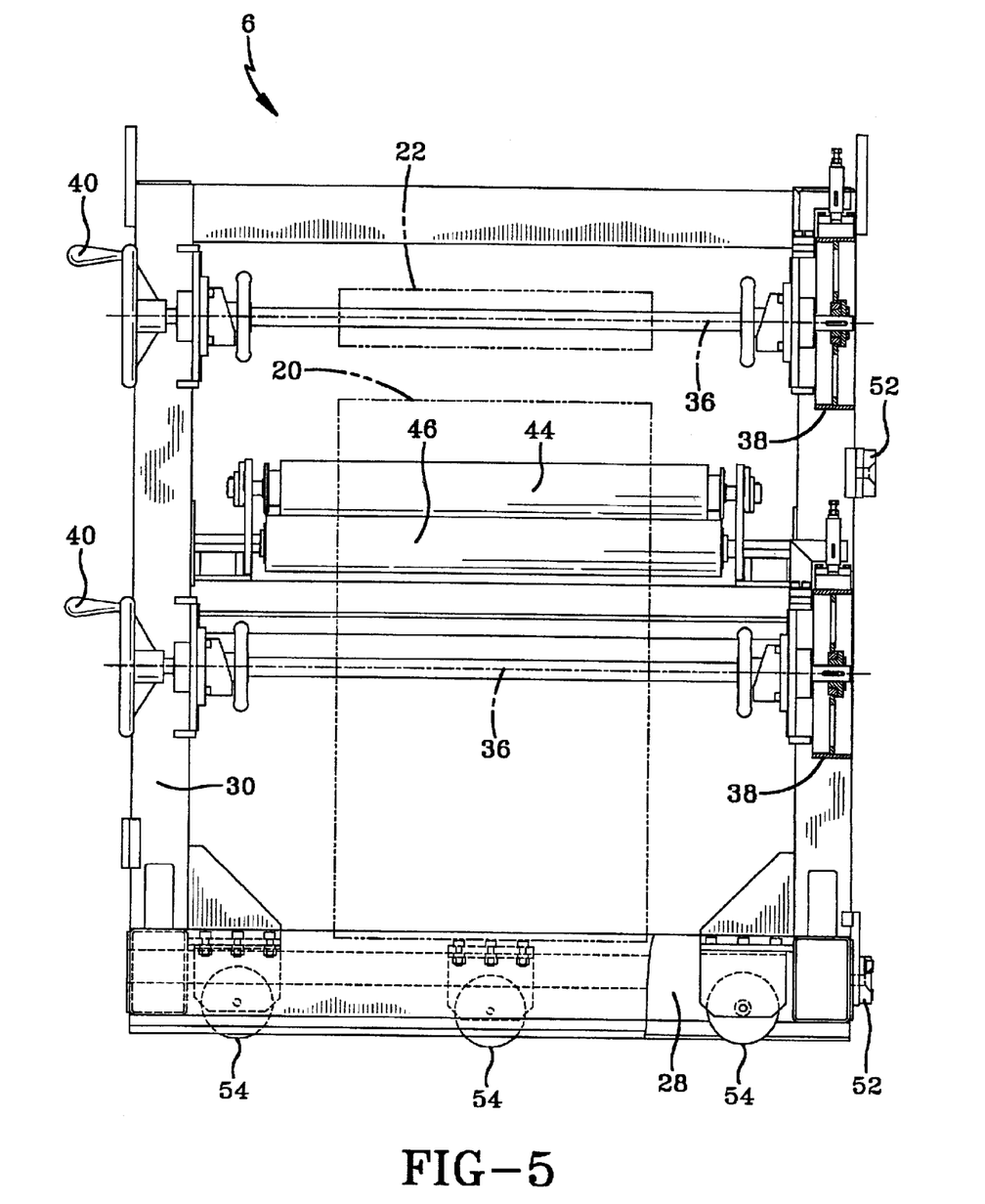
FIG. 5 is the material cartridge along line 5—5 of FIG. 4.
Figure 6:
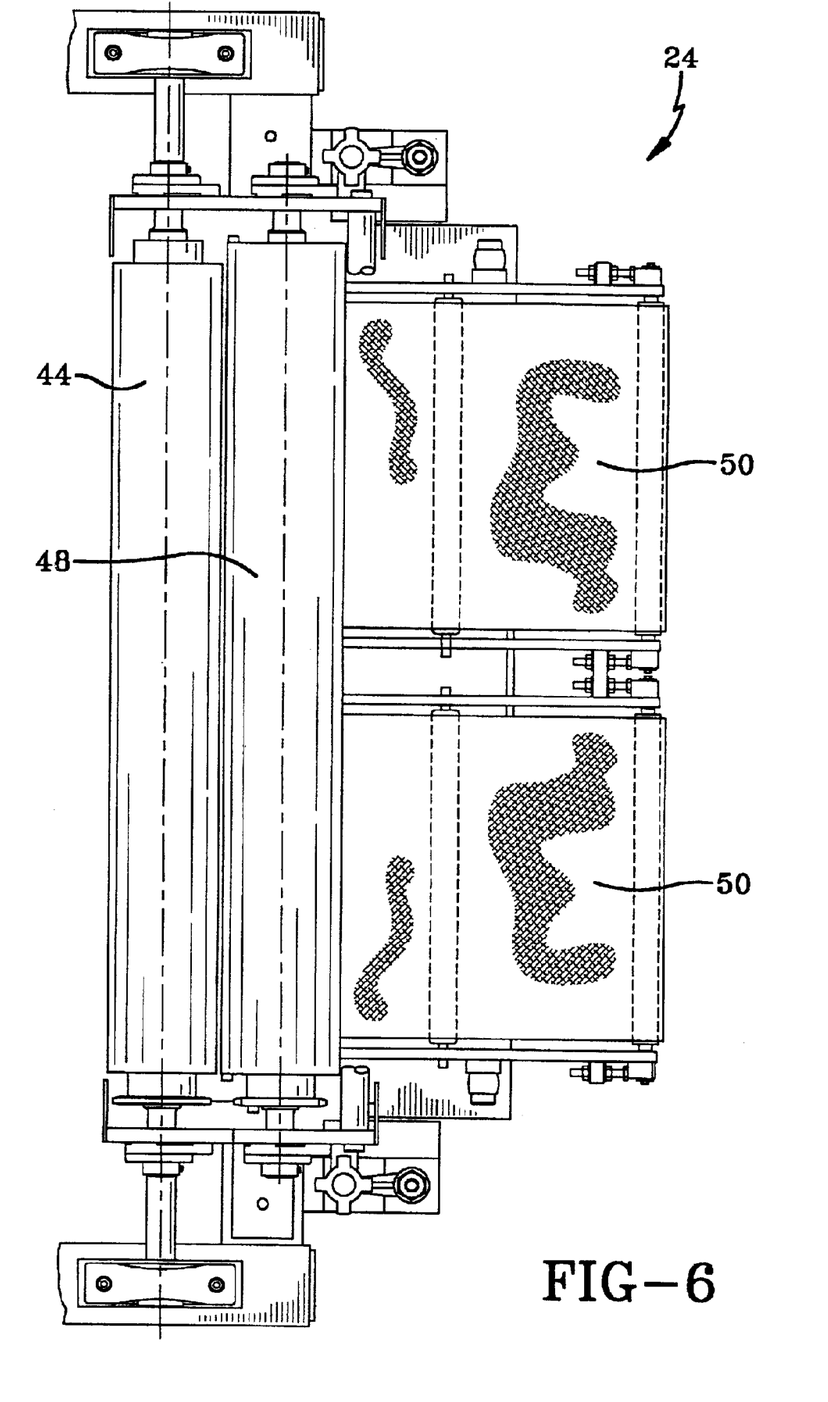
FIG. 6 is an overhead view of the stock left-off mechanism.

Each load cartridge 6 has an open frame structure, with means to mount both a stock material roll 20 and a separator sheet take-up roll 22, and a stock let-off assembly 24, see also FIGS. 4–6. The rectangular cartridge base has two side support beams 26 and two width support beams 28. Side support beams 30 extend from upwardly from the side base beams 26. On a first side of the side support beams 30 are means to mount the stock material roll 20. The stock material 32 may be rubber sheet, calendered cord, or calendered wire. The types of rubber, cord, and wire are of the type conventionally used in the manufacture of the carcass of rubber tracks.

On the opposing side of the side support beam 30, and vertically offset from where the stock material roll 20 is to be mounted, are means to mount the separator sheet take-up roll 22. The separator sheet 34 is originally between adjacent spiral layers of the stock material 32. The means for mounting the stock material and the take-up rolls allow for easy rotation, removal, and replacement of the rolls 20, 22. For both the stock material roll 20 and the separator sheet take-up roll 22, a shaft 36 extends between the side support beams 30. At the side of the cartridge 6 closest to the build table 2, the shaft 36 extends and terminates in a fly wheel 38. At the opposing end of each shaft 36, a hand wheel 40 may be provided to assist the builder in loading and unloading the cartridge 6.

The separator sheet 34 is separated from the stock material 32 at the stock let-off assembly 24. The stock let-off assembly 24 is located beneath the location of the take-up roll 22, and mounted on angular support frames 42 extending from each side support beam 30. The stock let-off assembly 24 has a top roll 44, a bottom roll 46, a side feed roll 48, and a feed conveyor 50.

The stock material 32 and the separator sheet 34 pass between the top and bottom rolls 44, 46 and are separated from each other at this point in the stock let-off assembly 24. The separator sheet 34 passes between the top roll 44 and the side feed roll 48 and is wound onto the take up roll 22. The stock material 32 passes beneath the feed roll 48 and onto the feed conveyor 50. The rolls 44, 46, and 48 are preferably synchronized by means of a drive belt passing about drive sprockets mounted at one end of the rolls 44, 46, 48. Side plates may be mounted at the ends of all three rolls 44, 46, 48.

The feed conveyor 50 may be either a roll conveyor or an endless belt conveyor. The selection of the type of conveyor is best determined by the properties of the stock material loaded in the cartridge 6. Typically, if the stock material 32 is rubber sheet, a belt conveyor operates better, and if the stock material 32 is calendered wire or cord, then a roll conveyor may operate better. In FIG. 6, the feed conveyor is a split belt conveyor.

If the stock material 32 being dispensed from the stock material roll 20 does not require a separator sheet 34 between adjacent layers of the material 32, than the load cartridge 6 upon which the stock material 32 is mounted need not have a separator sheet take-up roll 22. In such a case, the stock let-off assembly must still have a pair of rolls 44, 46 which act as pinch rollers to pull the material 32 off of the stock material roll 20.

When cartridges 6 are in the cartridge station 8, the width base beams 28 of the cartridge 6 rest on the drive wheels 14 and the cartridge 6 is secured in the station 8 by locks 52. The locks 52 are located on the side base beam closest to the power end of the cartridge station 8. To assist in moving the cartridge 6, or to wheel the cartridge 6 out of the cell A, wheels 54 are mounted along the underside of the carriage 6. The wheels 54, when the cartridge 6 is in its station 8, are not employed and are actually suspended in the air.

Mounted on the build table 2, and capable of traveling the length of the build table 2, is the build shuttle 4. The build shuttle 4 has an extending base frame 56 and mounted on the base frame is a second frame 57 upon which is a power dispenser unit 58, build conveyor 60, and a shear assembly 62, see FIG. 7. The build shuttle 4 may also have a centering system to ensure that each ply of stock material 32 is centered as it is laid on the build table 2 and the shuttle 4 may also have a stitching system that rolls the laid ply unto the previously laid plies.

Figure 7:
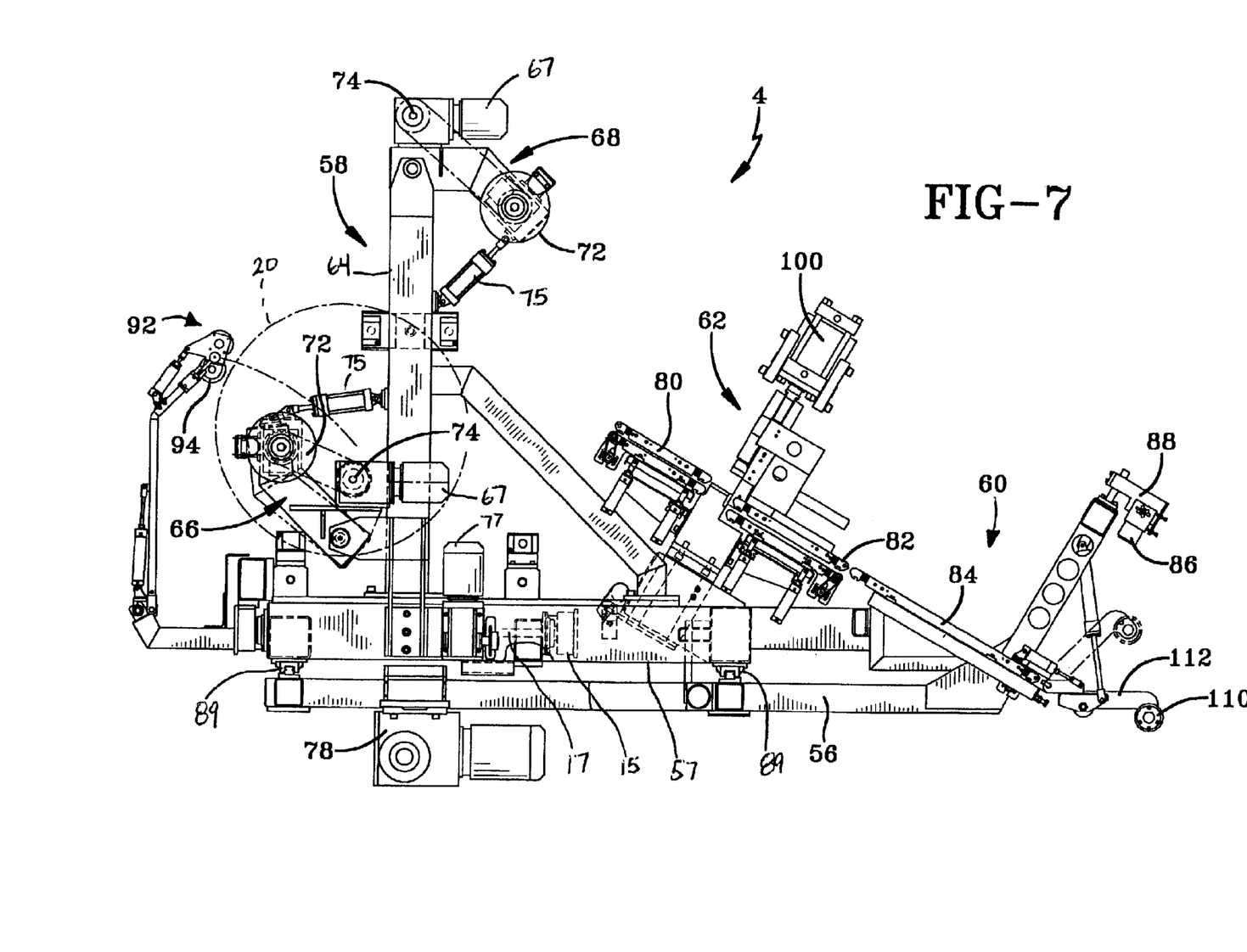
FIG. 7 is a side view of the build shuttle.
Figure 8:
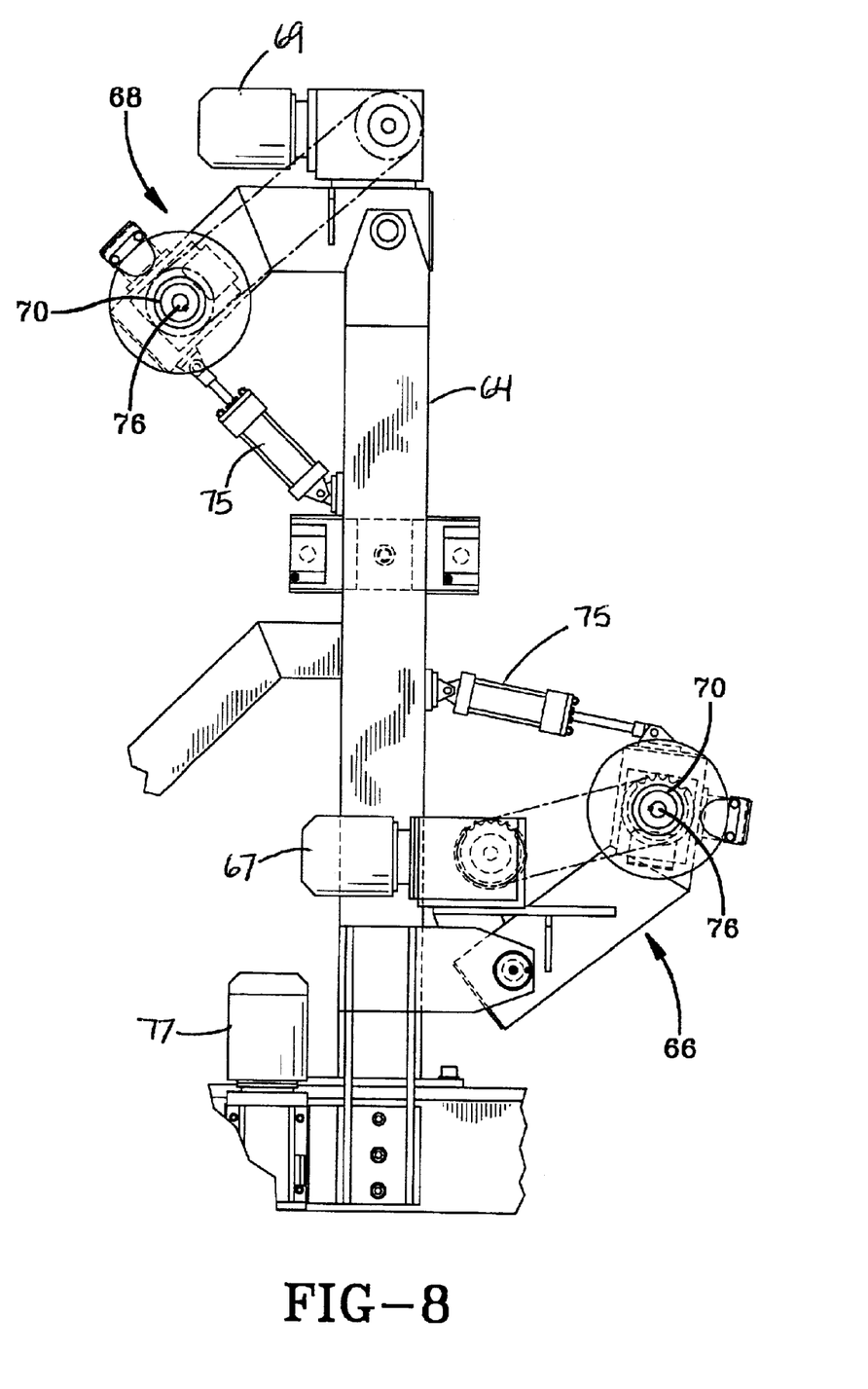
FIG. 8 is the drive column of the build shuttle.

The power dispenser unit 58 is located at one end of the base frame 56. The power dispenser unit 58 has a drive column 64 perpendicular to the base frame 56. At the lower end of drive column 64 is a lower drive arm 66. Mounted on the lower drive arm 66 is a drive wheel 70, an associated brake 72, and clutch 74. The drive wheel 70 is mounted on the inner side of the lower drive arm 66, facing the cartridge stations 8, see FIG. 8 which illustrates the inside view of the drive column 56. The associated brake 72 and clutch 74 are mounted on the outer side of the lower drive arm 66 and are connected to the drive wheel 70 through the drive wheel shaft 76. A motor 67 adjacent to the drive arm 66 powers the mechanisms of the lower drive arm 66. A pneumatic cylinder 75 is mounted to the column 64 and to the drive arm 66. When activated, the pneumatic cylinder 75 moves the drive arm 66 to initiate or terminate contact between the drive wheel 70 and the fly wheel 38 associated with the stock material roll 20.

Mounted at the top of the drive column 64, and on the opposite side of the column 64 from the lower drive arm 66, is the upper drive arm 68. Mounted on the upper drive arm 68 is a drive wheel 70 and an associated brake 72 and clutch 74. The drive wheel 70 is mounted on the inside of the upper drive arm 68. The associated brake 72 and clutch 74 are mounted on the outer side of the upper drive arm 68 and are connected to the drive wheel 70 through the drive wheel shaft 76, see FIG. 8. The motor 69 powers the mechanisms of the upper drive arm 68. A pneumatic cylinder 75 is mounted to the column 64 and to the drive arm 68. When activated, the pneumatic cylinder 75 moves the drive arm 68 to initiate or terminate contact between the drive wheel 70 and the fly wheel 38 associated with the take up roll 22. If none of the stock material 32 to be dispensed and built up into layers on the build table 2 requires a separator sheet, as discussed above, an upper drive arm is not required for the drive column.

Extending across the frame 57 of the build shuttle 4, at the power dispenser unit end of the shuttle 4, are pairs of drive wheels 15. The drive wheels 15 in each pair are connected by an axle 17. The wheels 15 of each pair are equidistant from the drive column 64 and are the same space apart as the drive wheels 14 in each cartridge station 8. The motor 77 adjacent to the drive column 64 powers the pairs of drive wheels 15.

Adjacent to the power dispenser unit 58 is the build conveyor 60. The build conveyor 60 is at an inclined angle relative to the shuttle base frame 56. The build conveyor 60 transports the stock material 32 along its length and onto the belt 10 of the build table 2. The build conveyor 60 may be constructed in multiple ways. The conveyor 60 may be a single belt conveyor, a plurality of small belt conveyors, or several adjacent belt conveyors, similar to feed conveyor 50. The conveyor 60 may also be a ball conveyor, a roll conveyor or a combination of ball and roll conveyors. As with the feed conveyor 50 on the load cartridge 6, the physical properties of the stock material 32 will determine which type of conveyor is best suited for use as the build-up conveyor 60.

In the illustrated build conveyor 60, there are three sets 80, 82, 84 of adjacent belt conveyors. The uppermost set 80 extends prior to the shear assembly 62, the middle set 82 extends from the exit point of the shear assembly 62 to just beyond the shear assembly 62, and the lowermost set 84 extends from the middle set 82 to a point adjacent to the surface of the build table conveyor belt 10.

Mounted at the end of the build conveyor 60 may be a component of a centering system. A digital or photoelectric means, such as the illustrated camera 86 is mounted onto a bracket 88 over the top of the build conveyor 60 and provides information regarding the width of the stock material 32. The camera 86 provides feedback within the system to ensure that the stock material 32 being laid upon the build table conveyor belt 10 is aligned and centered with previously laid plies of stock material 32. To adjust the alignment of the material 32 being laid down upon the build table conveyor belt 10, if a misalignment is detected, at a minimum, the lowermost portion 84 of the build conveyor 60 is capable of side-to-side movement to correct any misalignment. For this reason, it is advantageous to have the lowermost portion of the build conveyor distinct from the remainder of the build conveyor 60. As an alternative, the entire build conveyor 60, in conjunction with the shear assembly 62, and the power dispenser unit 58 may be capable of transverse, or side-to-side, movement. To achieve this, as noted, the power dispenser unit 58, the build conveyor 60, and the shear assembly 62 are mounted onto the frame 57. Frame 57 is mounted onto frame 56 via a set of liner slides 89, permitting the frame 57 and all of the components mounted thereon to laterally move and adjust the placement of the stock material 32 upon the table 2. The centering system is mounted directly onto the side frame 56, so that the system does not move.

Other sensing means may be located in various locations on the build shuttle 4 to assist in the proper placement of the stock material 32 and the proper build of a track carcass 90. Such other sensing means may also assist in providing information regarding the length of the material 32 being fed through the build shuttle 4 and onto the build table conveyor belt 10 to assist in building the track carcass 90 to the correct specification length. One such device is the encoder 92 located at the stock material roll 20. The encoder 92 has a roller 94 that contacts the stock material roll 20, tracking the amount of material 32, and liner 34, being fed out by the shuttle assembly 4. The encoder 92 may be located at any other location where it can contact at least either the stock material 32 or the liner 34 as it is feed off the roll 20. Additional sensing means can also include cameras located at the lowermost end of the conveyor 84 to determine when material 32 is laid upon the belt 10.

The shear assembly 62 is mounted over the build conveyor 60, and prior to the middle conveyor section 82, and shears the stock material 32 being laid on the build table conveyor belt 10. The shear assembly is shown in more detail in FIG. 9. The shear assembly 62 has a top knife blade 96 and a bottom knife blade 98. The top blade 96 is attached to a hydraulic cylinder 100 that is guided by the shear assembly frame 102. The bottom blade 98 is fixedly attached to the shear assembly frame 102. To prevent the blades 96, 98 from spreading apart when shearing the stock material 32, the shear assembly frame 102 is strengthened to stabilize the frame 102. Other types of cutting mechanisms other than the shear blades 96, 98 may be used in the shear assembly 62, including but not limited to rotary cutters, ultrasonic, or water cutting. The type of material 32 being cut will be a factor in the selection of the type of cutting mechanism used.

Figure 9:
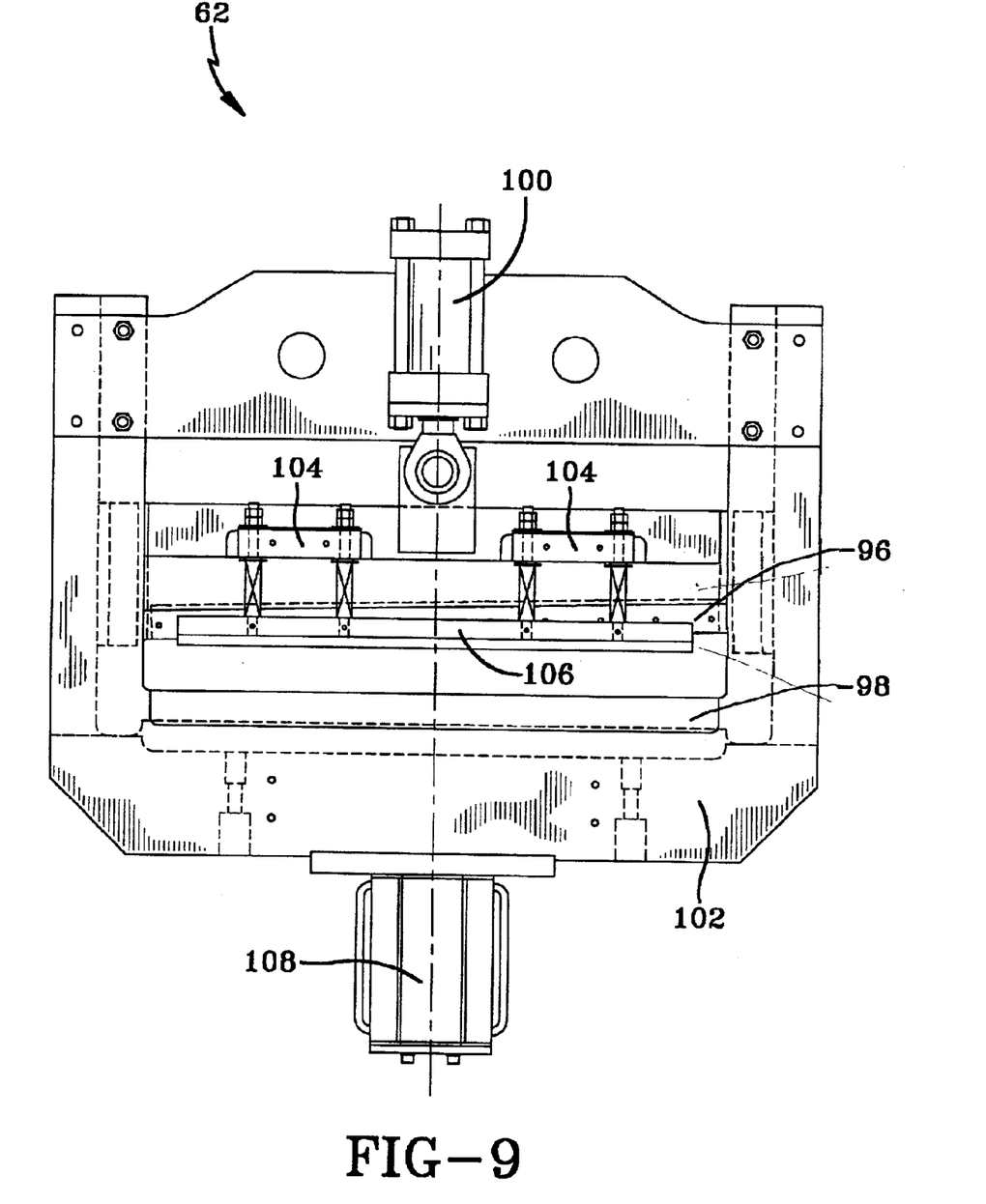
FIG. 9 is the shear assembly.

Sets of compression springs 104 are located adjacent the blades 96, 98 and are connected to a hold down bar 106. When stock material 32 is sheared, the springs are activated to force the hold down bar 106 against the stock material during the shearing.

The shear assembly 62 rotates the assembly +/−30° from the transverse direction.

The shear assembly 62 is on a central post 108 that permits it to rotate. The conveyors 80, 82 drop down for clearance when the shear assembly 62 is activated and also when the shear assembly 62 rotates.

Mounted at the end of the shuttle base frame 56 is an optional stitching system including a stitching roll 110. The stitching roll 110 is mounted pivotally at the end of the shuttle base frame 56. When not in use during traveling of the shuttle 4 along the length of the build table conveyor belt 10, the arms 112 holding the stitching roll 110 are maintained at an incline relative to the build table conveyor belt 10.

Figure 10:
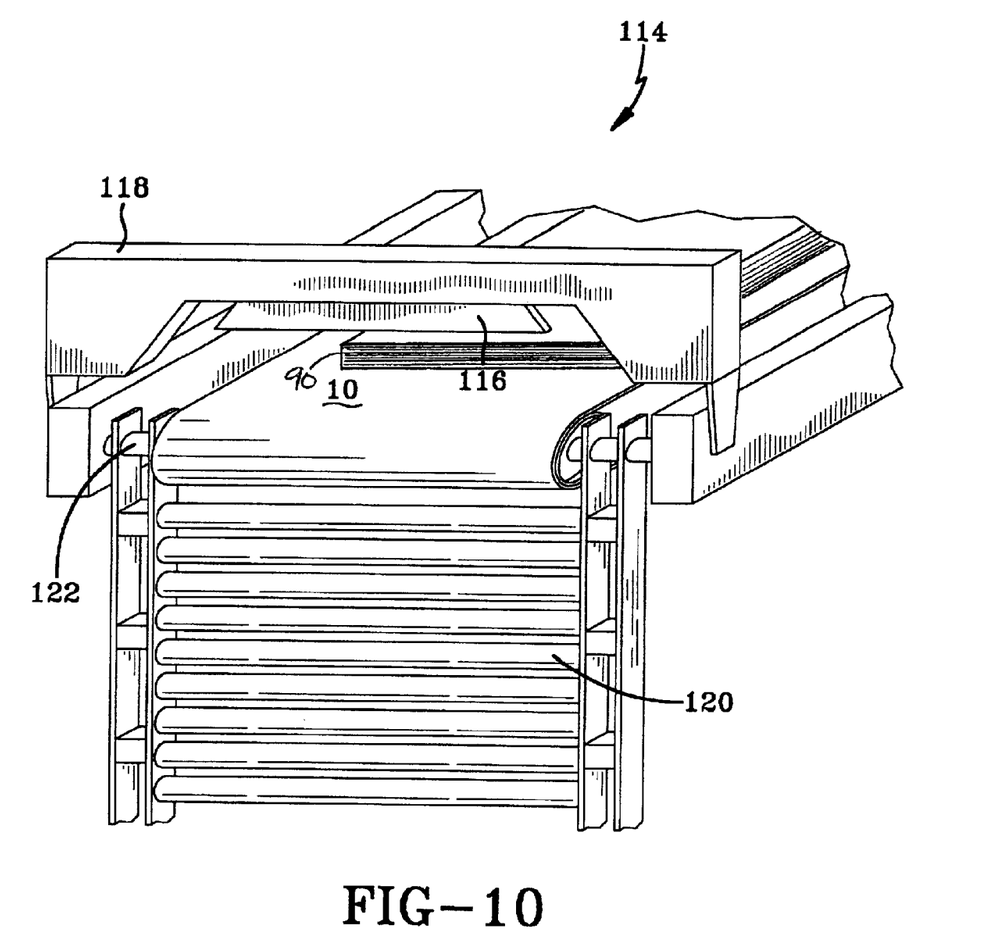
FIG. 10 is the hold down unit at the end of the build table.

To additionally assist in laying up the different plies of the track carcass 90, a hold-down unit 114 may be located at the end of the build table 2, see FIG. 10. The hold-down unit 114 travels a very short length at the end of the build table 2. The unit 114 has a center hold-down bar 116 mounted underneath a unshaped frame 118. Other types of hold down units may be employed other than the illustrated configuration.

To assist in moving the built-up carcass 90 off the table 2, a swing conveyor 120 may be provided at the end of the build table 2. Typically, the swing conveyor 120 is at a position perpendicular to the build table 2. The swing conveyor 120 is mounted so as to pivot about a point 122 coincident with the end roll about which the build table conveyor belt 10 turns. After pivoting, the swing conveyor 120 is parallel to the build table 2. The swing conveyor 120 is illustrated as a roll conveyor but may be a belt conveyor or a ball conveyor.

Operation of the Build Unit

Figure 3:
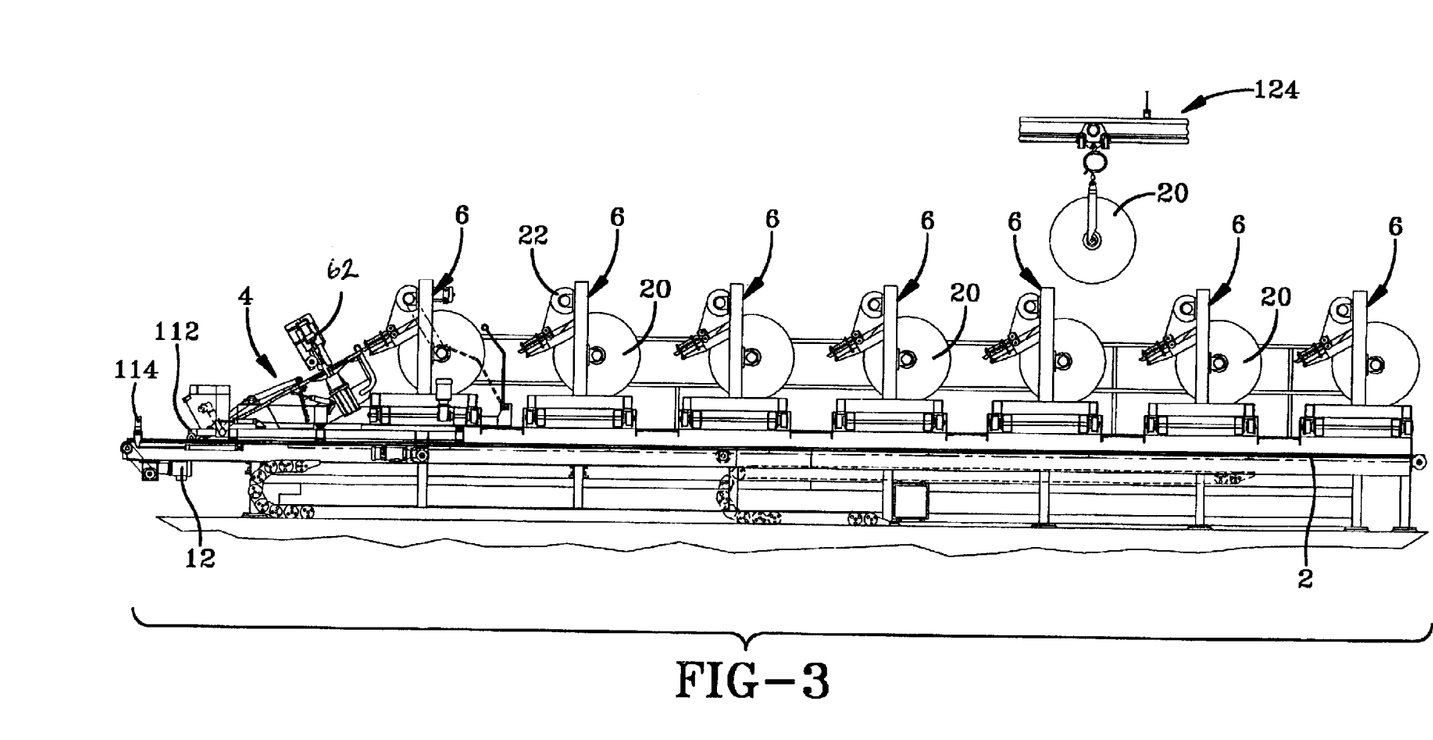
FIG. 3 is a side view of the building unit facing the build table.

Each load cartridge 6 is loaded with a roll 20 of stock material 32. The stock material 32 in each cartridge 6 may be distinct however, if a single type of stock material 32 is to be repetitively used in building the track carcass 90, than multiple cartridges 6 may be loaded with the same stock material 32. As seen in FIG. 3, new rolls 20 may be loaded into the cartridges 6 by means of an overhead transport system 124.

To begin building a track carcass 90, the build shuttle 4 travels the length of the build table 2 until it is directly adjacent a load cartridge 6 loaded with the appropriate stock material 32. The build shuttle 4 aligns itself with the load cartridge 6, aligning the pairs of drive wheels 15 on the build shuttle 4 with the drive wheels 14 in the cartridge station 8. Once the build shuttle 4 and the cartridge station 8 are aligned, the locks 52 maintaining the cartridge 6 in the cartridge station 8 are released, the motor 18 associated with the station is activated, the station clutch is disengaged, and the pairs of drive wheels 14 begin to rotate in the direction of the build shuttle 4. Simultaneously, the motor 77 on the build shuttle 4 located near the drive column 64 of the power dispenser 58 is activated and the drive wheels 15 in the build shuttle 4 begin to rotate in a direction towards the drive column 64.

The drive wheels 14 in the cartridge station 8 drive the load cartridge 6 out of the cartridge station 8 and the drive wheels 15 in the build shuttle 4 pull the load cartridge 6 onto the build shuttle 4. Once the cartridge 6 is on the build shuttle 4, locks secure the cartridge 6 onto the build shuttle 4 and the cartridge station motor 18 in the cartridge station 8 disengages. The build shuttle 4 then travels to the forward end of the build table 2 to begin dispensing the stock material 32.

When the load cartridge 6 is on the build shuttle 4, the pneumatics 75 are activated and the lower drive arm 66 moves so that the drive wheel 70 contacts the flywheel 38 at the end of the shaft 36 upon which is mounted the stock material roll 20, and the upper drive arm 68 moves so that the drive wheel 70 on the upper drive arm 68 contacts the flywheel 38 at the end of the shaft 36 upon which is mounted the take-up roll 22. The forward end of the feed conveyor 50 is aligned with the uppermost edge of the build conveyor 80.

The drive wheels 70 on the drive arms 66, 68 cause the rolls 20 and 22 to rotate and the pulling action of the rollers 44, 48, acting as nip rollers, in the feed conveyor 50 cause the stock material 32 to be fed onto the conveyor 50 and onto the build conveyor 60. As the stock material 32 is fed onto the build table conveyor belt 10, the build shuttle 4 moves along the length of the build table 2. Simultaneously when the build shuttle 4 begins moving down the table 2, the hold down unit 114 travels to the end of the stock material 32 on the build table 2 and the hold-down bar 116 drops down and retains the end of the stock material 32 in place on the table 2.

After the needed length of stock material 32 has been feed from the load cartridge 6, the shear assembly 62 shears the stock material 32 and build shuttle 4 continues to move back along the build table 2 to lay the remainder of the cut ply onto the table 2. Once the entire length of the spliced ply has been laid on the table 2, if the next ply of material 32 to be laid down is not loaded on the cartridge 6 currently on the build shuttle 4, the build shuttle 4 returns to the cartridge station 8 from which it removed the load cartridge 6. The operation which transferred the cartridge 6 onto the build shuttle 4 is reversed and the cartridge 6 is returned to the cartridge station 10. That is, the drive wheels 15 in the build shuttle 4 begin to rotate in the direction of the cartridge station 8, and the drive wheels 14 in the cartridge station 8 begin to rotate in the same direction, driving the load cartridge 6 off the build shuttle 4 and into the cartridge station 8. The shuttle 4 then moves to a location adjacent another cartridge station 8 to obtain a different load cartridge 6.

If the next ply to be laid down is the same stock material 32 that is in the currently loaded cartridge 6, the shuttle 4 may simply return to the front of the build table 2. In either situation, the build shuttle 4 is returned to the front of the build table 2 with a load cartridge 6 mounted thereon.

As the build shuttle 4 lays the stock material 32 down upon the build table conveyor belt 10, the stitching roll 110 may be down and stitching the ply as the shuttle 4 dispenses the stock material 32. Alternatively, as the shuttle 4 returns to the front of the build table 2, the stitching arms 112 drop down and the stitching roll 110 travels along the length of the laid down ply. As the shuttle 4 approaches the front of the build table 2, the hold-down bar 116 raises and the hold-down unit 114 returns to the end of the build table 2. Once the hold-down unit 114 is returned to the end of the table 2, the build shuttle 4 can lay down the next ply of stock material 32 on top of the previously laid ply.

After the plies of the track carcass 90 have been laid in accordance with the build specification, the uncured carcass structure 90 is removed from the build table 2. The conveyor belt motor 12 is engaged and the track carcass 90 is removed from the build table 2. To assist in moving the carcass 90 from the build table 2, the swing conveyor 120 swings to a position parallel to the build table 2. Alternatively, a moveable table-like conveyor, with a height equivalent to the build table 2, may be positioned at the end of the build table 2.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An apparatus for building a finite length structure, the structure comprising at least one sheet of material, the apparatus comprising a build shuttle, the build shuttle comprising:
   a pair of extending beams;
   a vertical column mounted on one of the beams and towards one end of the beam;
   at least one drive wheel mounted on the vertical column, distanced from the vertical column and mounted on the length beam, a shear assembly.

2. An apparatus in accordance with claim 1, the build shuttle further comprising a motor mounted adjacent to the vertical column, the motor providing power to the drive wheel.

3. An apparatus in accordance with claim 1, wherein a pair of drive wheels are mounted on the vertical column, the drives wheels being vertically and horizontally offset from one another.

4. An apparatus in accordance with claim 1, the build shuttle further comprising at least one conveyor adjacent to the shear assembly for transporting sheet of material.

5. An apparatus in accordance with claim 4 wherein the conveyor is able to shift its position relative to the base frame.

6. An apparatus in accordance with claim 1, the build shuttle further comprising stitching means located at the end of the frame, opposite from the vertical column.

7. An apparatus in accordance with claim 1, the extending beams of the build shuttle are mounted onto a pair of base beams, and the extending beams are capable of movement relative to the base beams.

8. An apparatus in accordance with claim 1, the apparatus further comprising a build table, the build table comprising rails mounted along the longitudinal sides of the build table and a conveyor belt.

9. An apparatus in accordance with claim 8 wherein the shuttle travels along the length of the build table.

10. An apparatus in accordance with claim 1 wherein the shear assembly is capable of pivoting angularly relative to the width of the base frame.

11. An apparatus in accordance with claim 1, the apparatus further comprising at least one cartridge station removably mounted onto the build shuttle, the cartridge station comprising at least one roll of stock material.

12. An apparatus for building a finite length structure, the structure comprising at least one sheet of material, the apparatus comprising a build shuttle, the build shuttle comprising:

a pair of extending beams;

a vertical column mounted on one of the beams and towards one end of the beam;

at least one drive wheel mounted on the vertical column for causing the sheet of material to be pulled and fed onto a build conveyor, distanced from the vertical column and mounted on the length beam, a shear assembly.

13. An apparatus in accordance with claim 12, the build shuttle further comprising a motor mounted adjacent to the vertical column, the motor providing power to the drive wheel.

14. An apparatus in accordance with claim 12, wherein a pair of drive wheels are mounted on the vertical column, the drives wheels being vertically and horizontally offset from one another.

15. An apparatus in accordance with claim 12, the build shuttle further comprising at least one conveyor adjacent to the shear assembly for transporting a material.

16. An apparatus in accordance with claim 15 wherein the conveyor is able to shift its position relative to the base frame.

17. An apparatus in accordance with claim 12 wherein the shear assembly is capable of pivoting angularly relative to the width of the base frame.

* * * * *